W. H. FITTS.
THERMOMETER.
APPLICATION FILED MAY 12, 1919.
1,394,484.
Patented Oct. 18, 1921.
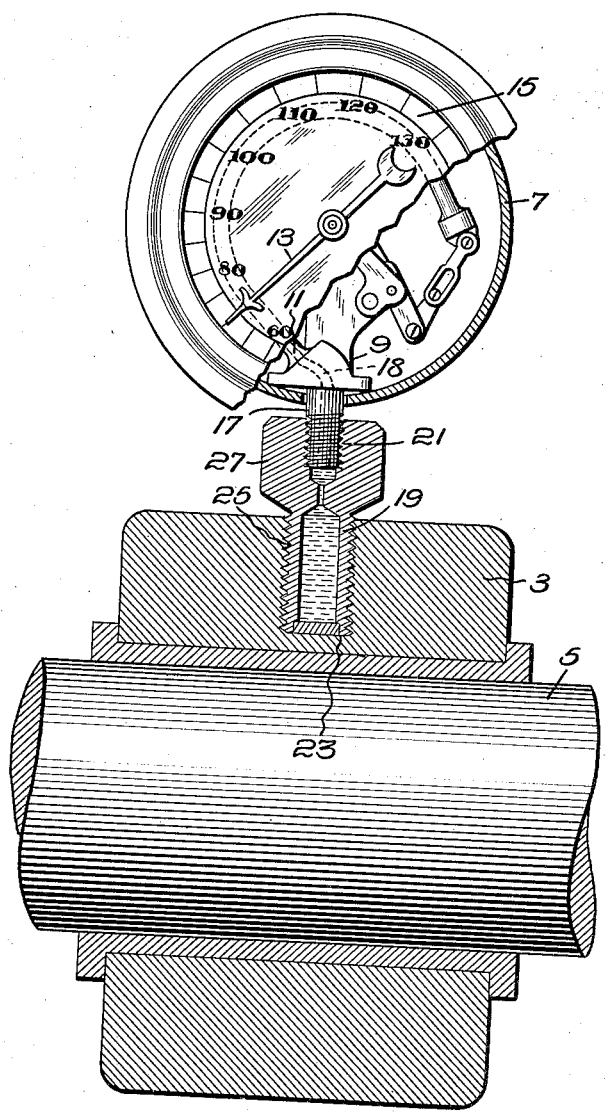
Inventor:
Walter H. Fitts,
by
Attys.

UNITED STATES PATENT OFFICE.

WALTER H. FITTS, OF FOXBORO, MASSACHUSETTS, ASSIGNOR TO THE FOXBORO COMPANY, OF FOXBORO, MASSACHUSETTS, A CORPORATION OF MASSACHUSETTS.

THERMOMETER.

1,394,484.  Specification of Letters Patent.  Patented Oct. 18, 1921.

Application filed May 12, 1919. Serial No. 296,692.

*To all whom it may concern:*

Be it known that I, WALTER H. FITTS, a citizen of the United States, and a resident of Foxboro, county of Norfolk, and State of Massachusetts, have invented an Improvement in Thermometers, of which the following description, in connection with the accompanying drawings, is a specification, like characters on the drawings representing like parts.

This invention relates to thermometers and has for its object the provision of an instrument of this nature particularly adapted to indicate the temperature of a solid.

My invention will be best understood by reference to the following description of an illustrative embodiment thereof taken in connection with the accompanying drawing wherein I have shown, partly in elevation and partly in section, a metallic thermometer of the indicating type utilized to show the temperature of a journal box.

Referring to the drawing, I have there shown an indicating thermometer adapted to show the temperature of a journal box 3 in which a shaft 5 turns. The thermometer shown is of the well known metallic type comprising a casing 7 in which there is a base 9 carrying a pressure sensitive tube 11 of the Bourdon or some similar type, the distortion of which is adapted to move the hand 13 over the dial 15 of the instrument. The base 9 is provided with a neck 17 projecting exteriorly of the casing 7 and through this neck and the base is a passage 18 providing communication with the interior of the tube, the whole constituting an example of a fluid-receiving chamber having a portion movable in response to changes of pressure therein.

My invention more particularly has to do with the bulb of the instrument which constitutes a reservoir for a pressure sensitive fluid such, for example, as alcohol which may also fill the tube 11 partially or completely. The bulb is subjected to the temperature to be measured and the changes in vapor tension of the liquid distort the tube 11 and cause the temperature to be indicated on the dial by the hand 13 in well known manner.

Herein the bulb 19 is a cup-shaped member of suitable heat-conducting material such as brass, having a closed bottom and a top provided with an aperture 21 to receive the neck 17, since in the illustrative embodiment the casing 7 is mounted directly over the bulb member. Exteriorly the bulb member is provided with relatively raised and depressed portions which may interengage with corresponding depressed and raised portions in a suitable opening 23 formed in the journal box or other member the temperature of which is to be measured. Herein the bulb is formed exteriorly with a thread 25 which may be screwed directly into a threaded aperture of the journal box. Preferably, as shown, the wall of the bulb is of substantial thickness and the opening therein is smooth interiorly, the wall being grooved on the outside to provide the screw thread. Above the threaded portion the bulb may, if desired, be provided with a hexagonal or similarly formed portion 27 facilitating screwing the thermometer into place.

By the provision of a bulb as described, not only is it easy to secure the thermometer in position on the journal box or other member but the thread forms a large surface which is brought into intimate contact with the metal of the journal box 3. While in the embodiment shown, wherein the walls of the bulb are of substantial thickness and merely grooved on the outside to provide the thread, distortion of the wall of the bulb is not probable, it is, nevertheless, a fact even in this case that the wall of the bulb obtains support from the female thread in the opening 23 which strengthens it and holds it rigid so that change in tension of the fluid within the bulb is transmitted unimpaired to the pressure sensitive tube 11. The bulb is also protected against outside shocks by being housed in the interior of the journal box.

In many types of machines, as for example Westinghouse turbines, the journal boxes have ring bolts threaded therein to facilitate installation of the machines. An opening which receives one of these ring bolts may be utilized to apply a thermometer such as I have here described.

Having thus described one preferred embodiment of my invention, what I claim as new and desire to secure by Letters Patent is:—

1. A thermometer having a reservoir for expansible fluid, the expansion of which provides an indication of the temperature to be measured, said reservoir consisting of an exteriorly threaded shell of conducting material whereby it may be placed in intimate contact with a solid body the temperature of which it is desired to measure.

2. An instrument of the class described having a pressure sensitive tube and a fluid containing bulb in communication therewith having an exteriorly threaded wall whereby it may be placed in intimate contact with a part the temperature of which it is desired to measure.

3. An instrument of the class described including a pressure receiving chamber having a portion movable in response to changes of pressure therein and a fluid containing bulb communicating with said chamber having an exteriorly threaded wall whereby it may be placed in intimate contact with a part the temperature of which it is desired to measure.

4. In combination, a solid member subject to changes of temperature which it is desired to measure and having therein an opening providing interiorly relatively raised and depressed portions and a thermometer having a fluid-containing bulb exteriorly formed with relatively depressed and raised portions to fit the raised and depressed portions before mentioned.

5. In combination, a solid member subject to changes of temperature which it is desired to measure and having a screw threaded opening therein, an exteriorly threaded member screwed into said opening and providing interiorly a fluid supply substantially housed within the confines of said solid member and in intimate heat conducting relation thereto because of the contact between said threaded member and the solid member and means connected to said member and providing in coöperation with said fluid supply an indication of temperature.

6. A thermometer comprising a base, a pressure sensitive tube carried thereby, a neck projecting from the base, there being a passage through said neck and base communicating with said tube, and a hollow bulb closed at one end and having at the other end an aperture receiving said neck, the wall of the bulb being of substantial thickness and having a helical groove in the outside, permitting it to be screwed into and therefore to make intimate contact with a part the temperature of which it is desired to measure.

In testimony whereof I have signed my name to this specification.

WALTER H. FITTS.